(12) United States Patent
Park et al.

(10) Patent No.: US 10,298,851 B2
(45) Date of Patent: May 21, 2019

(54) PORTABLE DEVICE FOR MAGNIFYING ELECTRONIC IMAGE

(71) Applicant: C & P Co., LTD., Busan (KR)

(72) Inventors: Kyeong Min Park, Seoul (KR); Kyoung Peo Park, Busan (KR); Se Gu Kang, Gyeonggi-do (KR)

(73) Assignee: C & P CO., LTD., Busan (KR)

( * ) Notice: Subject to any disclaimer, the term of this patent is extended or adjusted under 35 U.S.C. 154(b) by 0 days.

(21) Appl. No.: 15/567,609

(22) PCT Filed: Oct. 26, 2016

(86) PCT No.: PCT/KR2016/012106
§ 371 (c)(1),
(2) Date: Oct. 18, 2017

(87) PCT Pub. No.: WO2018/079872
PCT Pub. Date: May 3, 2018

(65) Prior Publication Data
US 2018/0295288 A1    Oct. 11, 2018

(51) Int. Cl.
*F16M 11/06*    (2006.01)
*G03B 17/56*    (2006.01)
(Continued)

(52) U.S. Cl.
CPC ......... *H04N 5/23293* (2013.01); *F16M 11/06* (2013.01); *G03B 17/56* (2013.01); *G03B 17/563* (2013.01); *H04N 5/2252* (2013.01)

(58) Field of Classification Search
CPC .... G06F 1/1643; G06F 1/1641; G06F 1/1605; G06F 1/1607; G06F 1/1686; G06F 1/166;
(Continued)

(56) References Cited

U.S. PATENT DOCUMENTS 4,360,264 A * 11/1982 Baker .................. G03B 27/323
355/27
5,615,854 A * 4/1997 Nomura ................. F16M 11/10
248/205.3
(Continued)

FOREIGN PATENT DOCUMENTS

| JP | 2009163180 | 7/2009 |
|----|------------|--------|
| KR | 100578428 | 5/2006 |

(Continued)

*Primary Examiner* — Chia Wei A Chen
(74) *Attorney, Agent, or Firm* — JCIPRNET

(57) ABSTRACT

The present invention relates to a portable device for magnifying an electronic image, the device includes: a body having a body frame, a camera module, a display module, an image processing module, and a guide pin; and a holder having a base plate, supporting ends respectively provided at opposite ends of an upper surface of the base plate to define a receiving space for receiving the body in an upper center of the base plate, and a guide groove provided on each inner surface of the supporting ends such that the guide pin is inserted into the guide groove, the holder rotating the body within a preset angle range while holding the body so as to obtain a focal length of the camera module and a viewing angle of the display module.

5 Claims, 3 Drawing Sheets

(51) Int. Cl.
*H04N 5/225* (2006.01)
*H04N 5/232* (2006.01)

(58) Field of Classification Search
CPC .... G06F 1/1613; G06F 1/1615; G06F 1/1616;
G06F 1/1618; G06F 1/1622; G06F 1/162;
G06F 1/1624; G06F 1/1626; G06F
1/1628; G06F 1/1632; G06F 1/163; G06F
1/1633; G06F 1/1637; G06F 1/1639;
G06F 2200/1613; G06F 2200/1614; G06F
2200/163; G06F 2200/1631; G06F
2200/1633; G06F 2200/1632; G06F
2200/1634; G06F 2200/1635; G06F
2200/1612; G06F 2200/1611; G06F
2200/161; G06F 1/1658; G06F 1/1656;
G06F 1/1654; G06F 1/1652; G06F 1/165;
G06F 1/1649; G06F 1/1647; G06F
1/1645; H04N 5/2251; H04N 5/2252;
H04N 21/4223; G03B 17/02; G03B
17/08; G03B 17/48; G03B 2217/00;
G03B 2217/002; G03B 29/00; A63F
13/213; A63F 2009/2435; B60R 2300/10;
B60S 1/0848; B66F 11/048; G06T
1/0014; G08B 13/19617; G08B 13/19619;
G08B 13/19623; G08B 13/1963; G08B
13/19632; H05K 5/00
See application file for complete search history.

(56) References Cited

U.S. PATENT DOCUMENTS

| | | | | |
|---|---|---|---|---|
| 6,209,834 B1 * | 4/2001 | Stonehouse | ............ | G01C 11/04 248/274.1 |
| 7,626,634 B2 * | 12/2009 | Ohki | ............ | F16M 11/10 348/207.1 |
| 8,325,912 B2 * | 12/2012 | Hu | ............ | H04M 1/0237 379/433.12 |
| 8,359,075 B2 * | 1/2013 | Richardson | ............ | G06F 1/1616 455/575.1 |
| 8,411,427 B2 * | 4/2013 | Jeong | ............ | H04M 1/0216 361/679.26 |
| 8,478,369 B2 * | 7/2013 | Ogatsu | ............ | G06F 1/1624 361/725 |
| 8,725,223 B2 * | 5/2014 | Saila | ............ | G06F 1/1616 455/550.1 |
| 8,743,278 B2 * | 6/2014 | Yoon | ............ | G02B 25/002 348/373 |
| 8,988,869 B2 * | 3/2015 | Ogatsu | ............ | G06F 1/1624 361/679.26 |
| 9,156,156 B2 * | 10/2015 | Wang | ............ | B65D 25/107 |
| D757,718 S * | 5/2016 | Park | ............ | D14/341 |
| 9,528,653 B1 * | 12/2016 | Hsu | ............ | F16M 11/18 |
| 10,008,135 B2 * | 6/2018 | Lim | ............ | G09F 9/00 |
| 2001/0024945 A1 * | 9/2001 | Inomata | ............ | H04M 1/0254 455/575.1 |
| 2004/0081422 A1 * | 4/2004 | Kawano | ............ | G02B 23/18 385/146 |
| 2004/0095500 A1 * | 5/2004 | Sato | ............ | H04N 1/00307 348/340 |
| 2004/0119699 A1 * | 6/2004 | Jones | ............ | G06F 3/0481 345/173 |
| 2005/0044665 A1 * | 3/2005 | Kuramochi | ............ | G06F 1/1616 16/341 |
| 2007/0259702 A1 * | 11/2007 | Kemppinen | ............ | G06F 1/1622 455/575.4 |
| 2007/0279853 A1 * | 12/2007 | Hung | ............ | G06F 1/1609 361/679.26 |
| 2008/0044009 A1 * | 2/2008 | Yeh | ............ | B60R 11/0235 379/454 |
| 2008/0200222 A1 * | 8/2008 | Jang | ............ | H04M 1/0237 455/575.4 |
| 2009/0104942 A1 * | 4/2009 | Arakane | ............ | G06F 1/1616 455/566 |
| 2010/0328856 A1 * | 12/2010 | Ojanto | ............ | H04M 1/0214 361/679.01 |
| 2011/0286158 A1 * | 11/2011 | Liang | ............ | H04M 1/0227 361/679.01 |
| 2012/0112031 A1 * | 5/2012 | Gormick | ............ | A45C 11/00 248/371 |
| 2013/0010431 A1 * | 1/2013 | Ogatsu | ............ | G06F 1/1624 361/727 |
| 2013/0021523 A1 * | 1/2013 | Chuang | ............ | H04N 5/2254 348/376 |
| 2013/0318853 A1 * | 12/2013 | Tesmar | ............ | F41G 1/38 42/123 |
| 2014/0009628 A1 * | 1/2014 | Jang | ............ | H04N 5/23222 348/207.1 |
| 2015/0054935 A1 * | 2/2015 | Muramatsu | ............ | G02B 21/24 348/79 |
| 2015/0258944 A1 * | 9/2015 | Buschmann | ............ | B60R 11/04 348/373 |
| 2015/0346770 A1 * | 12/2015 | Onda | ............ | G06F 1/1622 361/679.06 |
| 2015/0366089 A1 * | 12/2015 | Park | ............ | G06F 1/1641 361/679.01 |
| 2016/0066440 A1 * | 3/2016 | Choi | ............ | G06F 1/1637 361/679.3 |
| 2017/0078535 A1 * | 3/2017 | Akiyama | ............ | G03B 17/04 |
| 2017/0223158 A1 * | 8/2017 | Yin | ............ | H04M 1/02 |
| 2018/0054565 A1 * | 2/2018 | Smith | ............ | G03B 15/06 |
| 2018/0149868 A1 * | 5/2018 | Nakayama | ............ | B60K 35/00 |

FOREIGN PATENT DOCUMENTS

| | | |
|---|---|---|
| KR | 1020070042296 | 4/2007 |
| KR | 1020130086803 | 8/2013 |
| KR | 1020140036777 | 3/2014 |

* cited by examiner

PORTABLE DEVICE FOR MAGNIFYING ELECTRONIC IMAGE

CROSS-REFERENCE TO RELATED APPLICATION

This application is a 371 application of the international PCT application serial no. PCT/KR2016/012106, filed on Oct. 26, 2016. The entirety of the abovementioned patent application is hereby incorporated by reference herein and made a part of this specification.

BACKGROUND OF THE INVENTION

Technical Field

The present invention relates to a portable device for magnifying an electronic image, the device enabling the elderly or people having poor vision to easily view a small target by electronically magnifying the target, input by using a camera module, through an image processing module and outputting the target on a display module. More particularly, the present invention relates to a portable device for magnifying an electronic image, the device being used in various modes by enabling a camera module to be rotated and an angle of a body to be adjusted, and enabling a user to sign or write on various documents, papers, etc. since a holder does not positioned at the target and near the target that a camera module photographs.

Description of Related Art

A conventional portable device for magnifying an electronic image is a device for magnifying small text, which is difficult to see, written on a target such as a book, a newspaper, a magazine, a check, a business card, etc. so as to compensate the vision of the elderly or people having poor vision.

The conventional portable device for magnifying an electronic image receives an image of a target, magnifies the image at a particular rate according to a setting, and displays the image on a display. Generally, the conventional portable device is composed of a display module, a body provided with a camera module at the front and rear thereof, and a holder for holding the body at a preset angle.

However, in most conventional portable devices for magnifying an electronic image, the holder is provided at a rear surface or a side of the body in a folding structure or a rotating structure, and thus holding operation is uncomfortable. Also, the holder is positioned near the target that the camera module photographs, and thus there is significant restriction on signing a document which is a target or writing in a blank area of the document.

SUMMARY OF THE INVENTION

Accordingly, the present invention has been made keeping in mind the above problems, and an object of the present invention is to provide a portable device for magnifying an electronic image, the device having an enhanced holder structure facilitating holding operation, enabling signing or writing at a target and near the target, and ensuring portability.

In order to accomplish the above object, the present invention provides a portable device for magnifying an electronic image, the device including: a body having a body frame, a camera module provided on a rear surface of the body frame, a display module provided on a front surface of the body frame, an image processing module provided inside the body frame, and a guide pin provided on each of opposite sides of the body frame; and a holder having a base plate, supporting ends respectively provided at opposite ends of an upper surface of the base plate to define a receiving space for receiving the body in an upper center of the base plate, and a guide groove provided on each inner surface of the supporting ends such that the guide pin is inserted into the guide groove, the holder rotating the body within a preset angle range while holding the body so as to obtain a focal length of the camera module and a viewing angle of the display module.

The guide pin may include a first guide pin provided at a lower front end portion of each of the opposite sides of the body frame and a second guide pin provided at an upper middle portion of each of the opposite sides of the body frame, and the guide groove may include a first guide groove provided in a straight line shape from a lower front end portion to a lower middle portion on each inner surface of the supporting ends and a second guide groove provided in a curved line shape from an upper middle portion to an upper rear end portion on each inner surface of the supporting ends.

One of the first guide groove and the second guide groove may be provided with several angle fixing grooves into which an associated one of the first guide pin and the second guide pin is securely inserted so as to maintain a holding angle of the body frame, the several angle fixing grooves being deeper than the first guide groove or the second guide groove.

The camera module may be rotatably coupled to a camera holder drawably provided in the body frame, and the camera holder may be drawably inserted to an inside of the rear surface of the body frame, the camera holder being provided with a first end thereof slidably and rotatably coupled to the inside of the body frame and a second end thereof to which the camera module is rotatably coupled.

The rear surface of the body frame may be provided with an elastic piece securely supporting the camera holder at a preset angle in a downward direction by being elastically biased by a spring in the downward direction when the camera holder is drawn out of the body.

One of the supporting ends may be provided with an auxiliary handle being drawn out in a telescopic form, and in order to be provided without a height difference with the holder, the auxiliary handle may include: a first handle piece provided in a first handle insert space depressed on the upper surface of the base plate, the first handle piece being drawable while a first end thereof is locked; a second handle piece provided in the first handle insert space, the second handle piece being drawable while a first end thereof is connected to a second end of the first handle piece; and a third handle piece provided in a second handle insert space depressed on an outer surface of the one of the supporting ends, the third handle piece being drawable while an end thereof is hinge-connected to a second end of the second handle piece.

The present invention according to the above-described configurations can realize various effects as follows.

First, the body is coupled with the holder in a sliding structure and the body is backwardly pushed simply such that the body can be easily rotated on the holder within a preset angle range while being held. Also, when the body is backwardly pushed up, writing is possible in a photographing area of the camera module and a surrounding area thereof.

Second, the camera module is coupled to the camera holder rotatably drawn out of the rear surface of the body. Thus, when the body is rotated on the holder at a preset angle while being held, an angle of the camera module can be easily adjusted, whereby the target can be displayed by being photographed in various angles.

Third, the auxiliary handle in a telescopic form is provided at a side of the holder, and can be drawn out in two stages to serve as a grip as well as a handle, whereby the body can be easily gripped.

DESCRIPTION OF THE EMBODIMENTS

Hereinafter, a portable charging device for an electronic image according to the present invention is a device for displaying an image of a target on a display module by electronically magnifying the image through an image processing module, the image being obtained by using a camera module.

That is, the portable charging device for an electronic image according to the present invention is a device for magnifying text such as letters or numbers, etc. printed in a book, a newspaper, a magazine, a check, a business card, etc. so as to help the elderly or people having poor vision to comfortably read text.

Particularly, according to the portable charging device for an electronic image of the present invention, when the body, where the display module is provided on a front surface thereof and the camera module is provided on a rear surface thereof, is held on the holder for obtaining a viewing angle of the display module and a focal length of the camera module, photographing can be performed in various angles according to a tilting angle of the holder and a rotation direction of the camera module. Also, user action such as signing and writing various documents, etc. can be performed on the target that the camera module photographs and on a surrounding area of the target.

To this end, the structure of the holder is improved to minimize overall thickness increase due to the holder and to rotate the body on the holder in a slidable manner while holding the body. The structure of the camera holder is improved to rotate the camera module in various angles.

Hereinafter, the portable charging device for an electronic image according to a preferred embodiment of the present invention will be described in detail with reference to the accompanying drawings.

Figure 1:
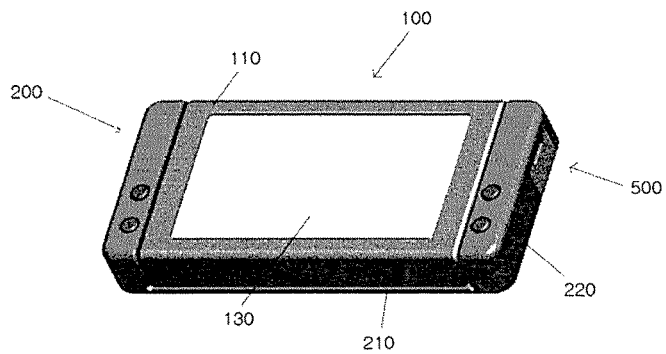
FIG. 1 is a front perspective view illustrating a portable device for magnifying an electronic image according to a preferred embodiment of the present invention.
Figure 2:
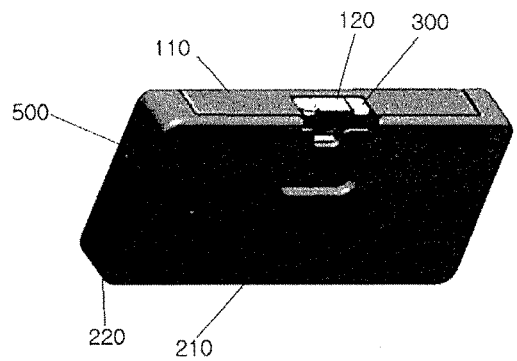
FIG. 2 is a rear perspective view illustrating a portable device for magnifying an electronic image according to a preferred embodiment of the present invention.

The portable charging device for an electronic image according to a preferred embodiment of the present invention may include a body 100 and a holder 200 as shown in FIGS. 1 and 2.

Figure 3:
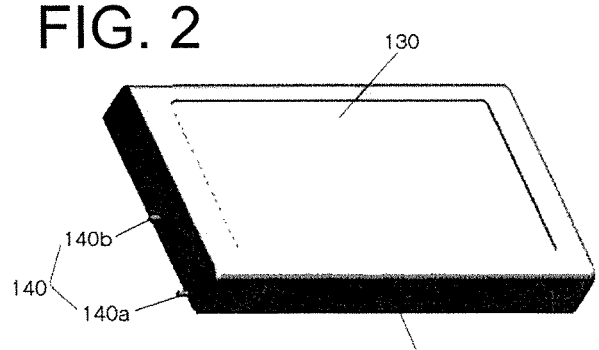
FIG. 3 is a perspective view illustrating a body of a portable device for magnifying an electronic image according to a preferred embodiment of the present invention.

First, as shown in FIGS. 1 and 3, it is desirable that the body 100 includes a body frame 110 in a laterally long rectangular shape, a display module 130 provided on a front surface of the body frame 110, a camera module 120 provided on a rear surface of the body frame 110, an image processing module (not shown) provided inside the body frame 110, and a guide pin 140 protruding from each of opposite sides of the body frame 110.

The camera module 120 obtains a target image by photographing the target. The image processing module receives the target image obtained by the camera module and electronically magnifies the target image through image processing in various manners.

The display module 130 displays the target image magnified by the image processing module so as to enable a user to view the target image by naked eye. The guide pin 140 enables the body frame 110 to move along the guide groove 230 of the holder 200 in a slidable manner.

That is, the body 100 provides the main function of showing the target image to the user by electronically magnifying the target image through the camera module 120, the image processing module, and the display module 130.

Figure 4:
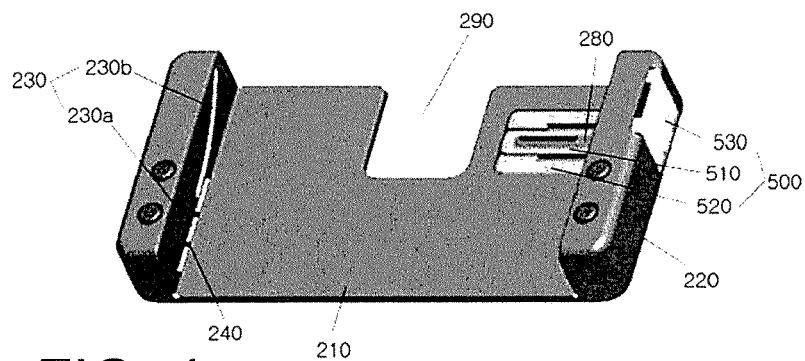
FIG. 4 is a perspective view illustrating a holder of a portable device for magnifying an electronic image according to a preferred embodiment of the present invention.

Second, as shown in FIG. 4, it is desirable that the holder 200 includes a base plate 210 provided in a flat plate shape that rests on the bottom, a supporting end 220 provided at each of opposite ends of an upper surface of the base plate 210, and a guide groove 230 depressed on an inner surface of the supporting end 220.

The base plate 210 stably supports the body 100 from the bottom by being rested on the bottom. The supporting end 220 rotatably supports the opposite sides of the body 100 by providing a receiving space for receiving the body 100 in an upper center of the base plate 210. The guide groove 230 enables the body 100 to be slid with the guide pin 140 on the holder 200 by inserting the guide pin 140 of the body 100 in the guide groove.

That is, the holder 200 receives the body 100 in the center thereof, and supports the opposite ends of the body 100 in a slidable manner.

However, as shown in FIG. 4, it is desirable that the base plate 210 is provided with a camera exposed space 290 such that the camera module 120 of the body 100 can normally photograph the target while the body 100 is held on the holder 200.

Here, when sliding the body 100 by backwardly pushing the body, a rear end portion of the body 100 may be upwardly rotated within a preset angle range with respect to a front end portion of the body 100 while being held by the holder 200. To this end, it is desirable that the guide pin 140 of the body 100 is composed of a first guide pin 140*a* and a second guide pin 140*b* as shown in FIG. 3, and the guide groove 230 of the holder 200 may be composed of a first guide groove 230*a* and a second guide groove 230*b* as shown in FIG. 4.

That is, the guide pin 140 is composed of both the first guide pin 140*a* provided at a lower front end portion of each of the opposite sides of the body frame 110 and the second guide pin 140*b* provided at an upper middle portion of each of the opposite sides of the body frame 110. The guide groove 230 is composed of both the first guide groove 230*a* formed in a straight line shape from a lower front end portion to a lower middle portion on the inner surface of each supporting end 220 and the second guide groove 230*b* formed in a curved line shape from an upper middle portion to an upper rear end portion on the inner surface of each supporting end 220.

Figure 5:
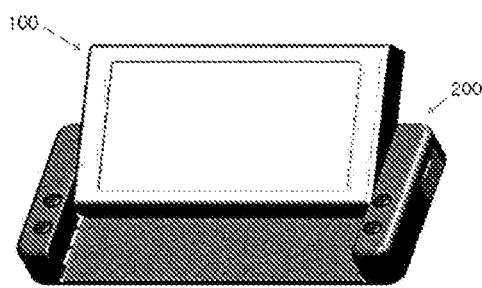
FIG. 5 is an exemplary view illustrating a held state of a portable device for magnifying an electronic image according to a preferred embodiment of the present invention.

Accordingly, when backwardly sliding the body 100, the first guide pin 140*a* backwardly moves along the first guide groove 230*a* in a horizontal direction and the second guide pin 140*b* upwardly moves along the second guide groove 230*b* in a diagonal direction, whereby the body 100 can be easily rotated as being held on the holder 200 as shown in FIG. 5.

Here, in order to maintain a holding angle of the body 100, at the first guide groove 230*a* or the second guide groove 230*b* as shown in FIG. 4, it is desirable that several angle fixing grooves 240 into which the first guide pin 140*a* or the second guide pin 140*b* is inserted is formed deeper than the first guide groove 230*a* or the second guide groove 230*b*.

Accordingly, the holding angle of the body 100 may be adjusted within a preset angle range according to positions of the angle fixing grooves 240 in which the first guide pin 140*a* or the second guide pin 140*b* is securely inserted, whereby the body 100 can be rotated as being held on the holder 200.

However, when pushing the body 100 by force at a particular level or higher, the first guide pin 140*a* or the second guide pin 140*b* can slide again along the first guide groove 230*a* or the second guide groove 230*b* by being separated from the angle fixing grooves 240.

Figure 6:
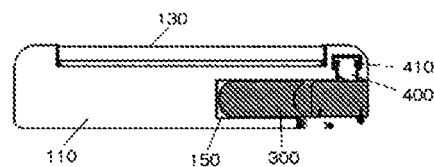
FIG. 6 is a longitudinal sectional view illustrating a body of a portable device for magnifying an electronic image according to a preferred embodiment of the present invention.

In the meantime, as shown in FIG. 6, the portable device for magnifying an electronic image according to a preferred embodiment of the present invention may further include a camera holder 300 to use the camera module 120 by being drawn out of the body 100.

It is desirable that the camera module 120 and the camera holder 300 are inserted in a camera insert space 150 formed at an inside of the holder 200 and can be drawn to outside.

Figure 7:
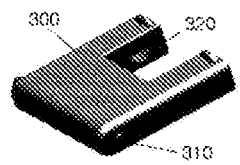
FIG. 7 is a perspective view illustrating a camera holder of a portable device for magnifying an electronic image according to a preferred embodiment of the present invention.

That is, as shown in FIG. 7, the camera holder 300 may be provided with a sliding protrusion 310 protruding from each of opposite sides of a first end of the camera holder such that the camera holder 300 can slide and rotate along the camera insert space 150 of the holder 200 as being coupled thereto. Also, the camera holder 300 may be provided with a supporting groove 320 at an inside of a second end of the camera holder, the supporting groove rotatably supporting opposite sides of the camera module 120.

Figure 8A:
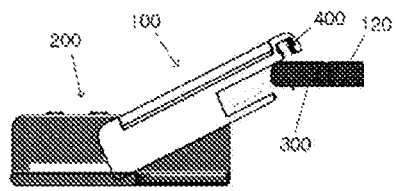
FIG. 8A, FIG. 8B is an exemplary view illustrating use stages of a portable device for magnifying an electronic image according to a preferred embodiment of the present invention.
Figure 8B:
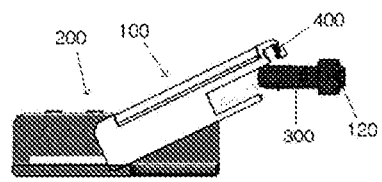

Accordingly, the camera holder 300 enables the camera module 120 to be drawn out of the body frame 110. Thus, a user can easily use the camera module in a reading mode, a distance mode, etc. In the reading mode as shown in FIG. 8A, the camera module 120 downwardly faces to view a target such as a book, etc. In the distance mode as shown in FIG. 8B, like a telescope, the camera module 120 faces forwardly to view a target such as an object distant ahead, etc.

However, in order to easily perform the above-described modes, an elastic piece 400 may be provided at a rear surface of the body frame 110 to enable the camera holder 300 to be parallel with the body frame 110 by securely supporting the camera holder 300 at a preset angle in a downward direction when the camera holder 300 is drawn out of the body 100.

Here, it is desirable that the elastic piece 400 is formed to be elastically biased by a spring 410 from an inside of the rear surface of the body frame 110 to outside. That is, when the camera holder 300 is inserted into the camera insert space 150, the spring 410 is compressed by the camera holder 300 such that the elastic piece is compressed into the inside of the body frame 110 as shown in FIG. 6. When the camera holder 300 is drawn out of the camera insert space 150, the elastic piece securely supports the camera holder 300 by being elastically biased by the spring 410 as shown in FIG. 8A, FIG. 8B.

Figure 9:
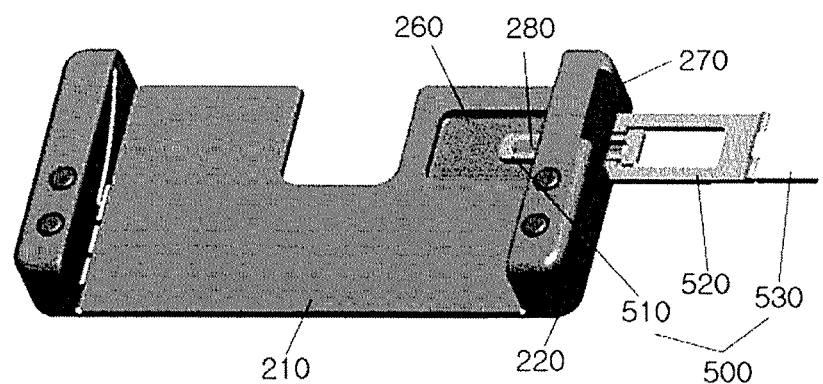
FIG. 9 is an exemplary view illustrating a state where an auxiliary handle is drawn out of a portable device for magnifying an electronic image according to a preferred embodiment of the present invention.

Also, the portable device for magnifying an electronic image according to a preferred embodiment of the present invention may further include an auxiliary handle 500 drawably provided at a side of the holder 200 such that the user can easily grip the portable device as shown in FIG. 9.

It is desirable that the auxiliary handle 500 is inserted inside of the holder 200 in a telescopic form to be drawn out without a height difference with the holder 200.

To this end, the auxiliary handle 500 may include: a first handle piece 510 provided in a first handle insert space 260 depressed on the upper surface of the base plate 210, the first handle piece being drawable while a first end of the first handle piece is locked by a locking protrusion 280; a second handle piece 520 provided in the first handle insert space 260, the second handle piece being drawable while a first end of the second handle piece is connected to a second end of the first handle piece 510; and a third handle piece 530 provided in a second handle insert space 270 depressed on an outer surface of the supporting end 220, the third handle piece being drawable while an end of the third handle piece is hinge-connected to a second end of the second handle piece 520.

Accordingly, as shown in FIG. 9, the auxiliary handle 500 will have sufficient length by drawing the third handle piece 530, the second handle piece 520, and the first handle piece 510 out in order according to user needs, whereby the user can easily move or lift the body 100 and the holder 200 while gripping them with the hand.

Also, although not shown, the auxiliary handle 500 may be used in a form of the handle as well as in a form of a grip with fingers while the first handle piece 510 and the second handle piece 520 are drawn out in order.

The above-described embodiment is only an example of the present invention, and it will be understood by those skilled in the art that the present invention can be modified in various forms.

Accordingly, the above-described embodiment as well as various modifications should be included in the true technical protection scope of the present invention without departing from the scope and spirit of the present invention as disclosed in the accompanying claims.

The present invention relates to a portable device for magnifying an electronic image, the device enabling the elderly or people having poor vision to easily view a small target by electronically magnifying the target, input by using a camera module, through an image processing module and outputting the target on a display module. More particularly, the present invention can be used in the field of a portable device for magnifying an electronic image, the device being used in various modes by enabling a camera module to be rotated and an angle of a body to be adjusted, and enabling a user to sign or write on various documents, papers, etc. since a holder does not positioned at the target and near the target that a camera module photographs.

What is claimed is:

1. A portable device for magnifying an electronic image, the portable device comprising:
    a body having a body frame, a camera module provided on a rear surface of the body frame, a display module provided on a front surface of the body frame, an image processing module provided inside the body frame, and a guide pin provided on each of opposite sides of the body frame; and
    a holder having a base plate, supporting ends respectively provided at opposite ends of an upper surface of the base plate to define a receiving space for receiving the body in an upper center of the base plate, and a guide groove provided on each inner surface of the supporting ends such that the guide pin is inserted into the guide groove, the holder rotating the body within a preset angle range while holding the body so as to obtain a focal length of the camera module and a viewing angle of the display module,
    wherein the guide pin includes a first guide pin provided at a lower front end portion of each of the opposite sides of the body frame and a second guide pin provided at an upper middle portion of each of the opposite sides of the body frame, and the guide groove includes a first guide groove provided in a straight line shape from a lower front end portion to a lower middle portion on each inner surface of the supporting ends and a second guide groove provided in a curved line shape from an upper middle portion to an upper rear end portion on each inner surface of the supporting ends.

2. The portable device of claim 1, wherein one of the first guide groove and the second guide groove is provided with several angle fixing grooves into which an associated one of the first guide pin and the second guide pin is securely inserted so as to maintain a holding angle of the body frame, the several angle fixing grooves being deeper than the first guide groove or the second guide groove.

3. The portable device of claim 1, wherein the camera module is rotatably coupled to a camera holder drawably provided in the body frame, and
    the camera holder is drawably inserted to an inside of the rear surface of the body frame, the camera holder being provided with a first end thereof slidably and rotatably coupled to the inside of the body frame and a second end thereof to which the camera module is rotatably coupled.

4. The portable device of claim 3, wherein the rear surface of the body frame is provided with an elastic piece securely supporting the camera holder at a preset angle in a downward direction by being elastically biased by a spring in the downward direction when the camera holder is drawn out of the body.

5. The portable device of claim 1, wherein one of the supporting ends is provided with an auxiliary handle being drawn out in a telescopic form, and
    in order to be provided without a height difference with the holder, the auxiliary handle includes: a first handle piece provided in a first handle insert space depressed on the upper surface of the base plate, the first handle piece being drawable while a first end thereof is locked; a second handle piece provided in the first handle insert space, the second handle piece being drawable while a first end thereof is connected to a second end of the first handle piece; and a third handle piece provided in a second handle insert space depressed on an outer surface of the one of the supporting ends, the third handle piece being drawable while an end thereof is hinge-connected to a second end of the second handle piece.

* * * * *